(12) United States Patent
Wolfson et al.

(10) Patent No.: US 8,632,409 B2
(45) Date of Patent: Jan. 21, 2014

(54) METHOD AND APPARATUS FOR ONLINE RENDERING OF GAME FILES

(75) Inventors: Roger Daniel Wolfson, Redmond, WA (US); Michael Ryan Williams, Kirkland, WA (US); Aaron David Lieberman, Seattle, WA (US); Thomas George Gioconda, Duvall, WA (US); Christopher Michael Gossett, Kirkland, WA (US); Stanton Hill Steward, Seattle, WA (US)

(73) Assignee: Bungie, LLC, Kirkland, WA (US)

( * ) Notice: Subject to any disclaimer, the term of this patent is extended or adjusted under 35 U.S.C. 154(b) by 196 days.

(21) Appl. No.: 12/778,044

(22) Filed: May 11, 2010

(65) Prior Publication Data

US 2011/0281645 A1 Nov. 17, 2011

(51) Int. Cl.
*G06T 15/00* (2011.01)
(52) U.S. Cl.
USPC ............................. 463/42; 345/473

(58) Field of Classification Search
USPC .......................... 463/40–43, 31, 37; 345/473
See application file for complete search history.

(56) References Cited

U.S. PATENT DOCUMENTS

| | | | |
|---|---|---|---|
| 6,999,083 B2 * | 2/2006 | Wong et al. | 345/473 |
| 7,384,339 B2 | 6/2008 | LeMay et al. | |
| 8,025,572 B2 * | 9/2011 | Spanton et al. | 463/42 |
| 2003/0038805 A1 * | 2/2003 | Wong et al. | 345/473 |
| 2006/0058103 A1 * | 3/2006 | Danieli et al. | 463/42 |
| 2007/0117635 A1 * | 5/2007 | Spanton et al. | 463/43 |
| 2007/0136572 A1 * | 6/2007 | Chen et al. | 713/153 |
| 2008/0113812 A1 | 5/2008 | Kwon | |
| 2008/0125226 A1 * | 5/2008 | Emmerson | 463/42 |
| 2008/0268961 A1 | 10/2008 | Brook et al. | |
| 2008/0311997 A1 | 12/2008 | Goossen et al. | |

* cited by examiner

*Primary Examiner* — Masud Ahmed
(74) *Attorney, Agent, or Firm* — Davis Wright Tremaine LLP; George Rondeau, Jr.; Heather M. Colburn

(57) ABSTRACT

A method and apparatus for automatically rendering a game file to an audio/video file format to allow the action recorded in the game file to be viewed without requiring the corresponding game and game system.

18 Claims, 5 Drawing Sheets

METHOD AND APPARATUS FOR ONLINE RENDERING OF GAME FILES

FIELD OF THE INVENTION

The present invention relates to video games that are able to record the action within a game for subsequent playback within the game. More particularly, the present invention takes such a record, renders it, and captures the result to an audio/video file, for subsequent playback without the game.

CROSS REFERENCE TO RELATED APPLICATIONS

Not Applicable.

STATEMENT REGARDING FEDERALLY SPONSORED RESEARCH OR DEVELOPMENT

Not Applicable

REFERENCE TO COMPUTER PROGRAM LISTING APPENDICES

Not Applicable

BACKGROUND OF THE INVENTION

In present-day video games, as in televised sports, a popular feature is "instant replay." This feature allows a play or event that has just occurred live to be re-shown to the player(s) or to an audience.

For the case of televised sports, the video signal from each of the cameras covering the action is recorded and perhaps compressed. To achieve an instant replay, one or more of those recordings is replayed. If a different camera is selected for playback than was originally selected, then the audience is able to experience the same play or event from a different viewpoint. In some sports, the judges or referees present at the live event may use "instant replay" technology, but as a way of reviewing the play or event from a vantage other than their own experience of the game.

In video games, the technology is different. Recording video is a computationally heavy burden that is often not even supported by a game console's hardware, where the rendering of audio and video graphics is performed by dedicated chips whose outputs may not be accessible to a main processor for capture. Further, it is commonly the nature of video games to make maximum use of the computational resources, so little excess capability is left unused. Thus, even when possible, capture of video for later playback, even from the original game player's point of view, would severely limit the other features of the game, for example graphics complexity, number of players, number of game objects, etc.

To overcome this limitation, many modern games will instead capture a "game file." A "game file" contains data representative of the game state at one or more points (for example, the initial state at the beginning of the game, or a checkpoint at some intermediate state during play), and timestamped or periodic data necessary to reproduce the original sequence of events in the game. Such timestamped or periodic data might represent, for example, game controller button presses. This requires the game to be substantially deterministic: Starting from a specific state, with specific input events applied at specific times, the game outcome will be either exactly or substantially the same.

In a single player game, the only events that can affect a deterministic game are those input by the player. Such input events may include simple controller inputs, such as button presses and releases, or periodic joystick readings or joystick position updates. Input events may also come as the results of processing more complex control inputs. For example, a complex control input may be the analysis of video from a camera watching the player: When the video of the player's motions is analyzed, the system may recognize a predetermined gesture (e.g., a wave) or a value (e.g., angle at which the player's body is leaning), which produces an input event. Another example of a complex control input is an audio input from a microphone monitoring a player's voice: Application of a speech recognition algorithm can recognize spoken commands or the level of stress in the player's voice, where a recognized command or stress value becomes an input event.

In a multi-player game, the input events produced by each of the players can be recorded. When players all have separate controllers on the same console, this is common. However, in a distributed multi-player game, where different players have separate consoles connected through a communications channel (e.g., infrared link, Bluetooth (™), wired or wireless local area network, telephone network or the Internet), it can be sufficient to record only the messages sent among consoles. In some distributed multi-player games, the input events from each player are processed by the corresponding console, and those input events result in changes to the state of in-game objects, which are then shared. Such an implementation choice may be made because data representing the changes to in-game objects is smaller than the data representing the input events, or because processing the input events from all the players is too great a burden. For example, when a joystick input is used for aiming, determining the currently selected target may be an expensive computation, so rather than exchange the current joystick value and require all participating consoles to compute the currently selected target, the console to which the joystick is attached may determine the target and send the target's identity to the other consoles. To send raw input events versus preprocessed object updates is an implementation decision, and may vary even within a game application (i.e., objects updates are sent in some cases, and raw input events are sent in others).

Thus, the timestamped data to be recorded in a game file can represent either input events from players, or the messages received by a console from the other game participants, or a mix thereof. A game file of this kind is used, for example, in Halo 3 (™), published by Microsoft, Inc, of Redmond, Wash., beginning in September of 2007.

Given such a "game file," an instant replay can be achieved on a similar console running the same game program. The game state, as recorded in the game file, is used to recreate the game state on the console as it happened in the original play. Then, the timestamped data is supplied to the game engine, in lieu of actual input from player controls or other consoles. This can occur in real-time, in which case the playback audio and video is similar to if not identically what the player originally saw, or the game console can playback using a slowed-down clock, in which case the playback can be in slow motion.

Generally, game files cannot be played backwards, because the nature of the game model cannot be run in reverse. In some implementations, to support a rewind capability, game files include intermediate checkpoints. Each intermediate checkpoint includes a game state, similar to that of the initial state, from which playback of the game file can be started. With intermediate checkpoints, a rewind facility can be provided to allow a player to replay a piece of the action repeatedly, without having to always start over at the beginning of the game file. In Halo 3 (™) (op. cit.), intermediate checkpoints are included in the game file every few seconds. Thus, when reviewing the record of a game, a user can skip forward or backwards to any point in the file, with a temporal resolution of a few seconds.

In some implementations, notably that of Halo 3 (™), during playback of a game file, the user has the option of altering the camera position to be different from that which the original player experienced. For example, the original player may have been playing with the camera set to the first-person point-of-view (POV) of the player's character, that is, the game was seen through the eyes of the player's own character.

However, upon playback, the camera can be switched to watch the action from another character's POV, or from behind the player's character. In some implementations, the camera can fly over the action—either tethered to a character, or constrained to point toward a character, or both, or neither: free to fly and point anywhere.

Only minor edits to a game file are appropriate. For example, an override of the original camera position can be recorded during a playback and incorporated into an edited game file. It is up to the implementation to determine whether this override replaces the camera position as originally recorded, or whether the override is distinct from the original camera position, such that a "use original camera position" option can be presented in case the user later decides that a portion of the original camera position record was preferred to the edited version.

With a sound or video recording, an editor has the ability to specify an "in-point" and "out-point" within the recording to identify a particular segment of the recording that is desired for playback or copying. Similarly, an in- and/or out-point may be specified for a game file. This allows a user having a complete game file, which might run for fifteen minutes, to identify a portion of interest. Thus, if a spectacular thirty-second event, worthy of sharing, occurred at seven minutes and two seconds into a fifteen-minute game file, an in- and out-point could be specified that directs playback of the edited clip to show substantially only the selected interesting part. Thus, by setting the in- and out-points, the interval of live game play represented by the game file may be an entire session, or a specific interval of interest.

In some implementations, including Halo 3 (™), edited game files may be made smaller than the original file by dropping any game states and events from the start of the game file up to (but not including) the intermediate checkpoint at or immediately prior to the specified in-point. If there is no intermediate game state prior to the in-point, or no in-point is set, then the start of the file is not clipped in this way. The edited game file may also be shortened by dropping all events and intermediate game states that occur after the out-point, if any. In the prior example, the fifteen-minute game file could be saved as an edited game file that was only about thirty seconds long (or slightly longer as will be discussed below).

In some implementations that allow an in-point to be specified as a time or frame number having a precision greater than that of the corresponding prior game state (whether the initial game state, or an intermediate checkpoint), the game console begins playback at the game state immediately prior to the in-point specified, but keeps video blanked and audio muted until the in-point is reached. For this reason, if a game were to save intermediate checkpoints every five seconds, then the edited game file in the example above would contain thirty to thirty-five seconds worth of data, even if the in- and out-points selected were thirty seconds apart.

Thus an edited game file may be saved as a "clipped game file," and contain only the intermediate game states that are both immediately prior to the in-point and prior to the out-point, and the game events that are between that first retained game state up to those at the out-point. However, in all respects, a clipped game file is still a game file, and may be treated in the same way, including subsequent editing. Upon playback, the resulting clipped game file still resembles an ordinary game file, but the playback can begin in medias res (in the middle of the action). The reduced size takes up less storage and is easier and less expensive to share, since upload and download times are reduced.

The ability to alter the camera's vantage during playback of a game file provides a sophisticated instant replay mechanism, allowing a player to review his own play, to determine why a particular strategy succeeded or failed. The addition of setting in- and out-points to quickly get to the interesting action (which may or may not include clipping game files) provides a good way to show the performance to others, either to be instructive, or entertaining.

There is a drawback to game files, however, namely that in order for them to be viewed, a user must have an appropriate game console and a copy of the game. This is fine for players who are using game files for instant replay, or who are sharing game files with other players who already own the game, but severely limits the audience for what may otherwise be an enjoyable form of entertainment.

OBJECTS AND SUMMARY OF THE INVENTION

The present invention permits game files such as those discussed, whether edited or not, to be uploaded to a remote server which can render the playback of the game as a audio/video file suitable for viewing outside of the game in which they were recorded, whether on a similar console or otherwise. In particular, the rendered file can be distributed, for example over the Internet, and viewed, for example on a personal computer, for instance within a web browser. The resulting video file can be transferred to DVD (using DVD authoring software, which may include transcoding if needed) or edited, using video editing software to combine it with other such video files, and/or the audio track may be altered.

From a game file, this invention conveniently produces an audio/video file that may be distributed to individuals not having the corresponding game disc (or cartridge) or a compatible console, and thus provides a more versatile entertainment source which may, beyond merely entertainment, challenge, or teach other players to attempt similar in-game feats, and entice non-players to acquire the console and/or game.

The present invention may offer a selection of output resolutions for the resulting video file. Further, the present invention may be arranged to offer its capabilities to users as a premium service, in some embodiments with the higher output resolutions available only at a higher premium.

BRIEF DESCRIPTION OF THE DRAWINGS

The aspects of the present invention will be apparent upon consideration of the following detailed description taken in conjunction with the accompanying drawings, in which like referenced characters refer to like parts throughout, and in which:

FIG. 2 is a user interface showing uploaded game files offering a render request;

Figure 4:
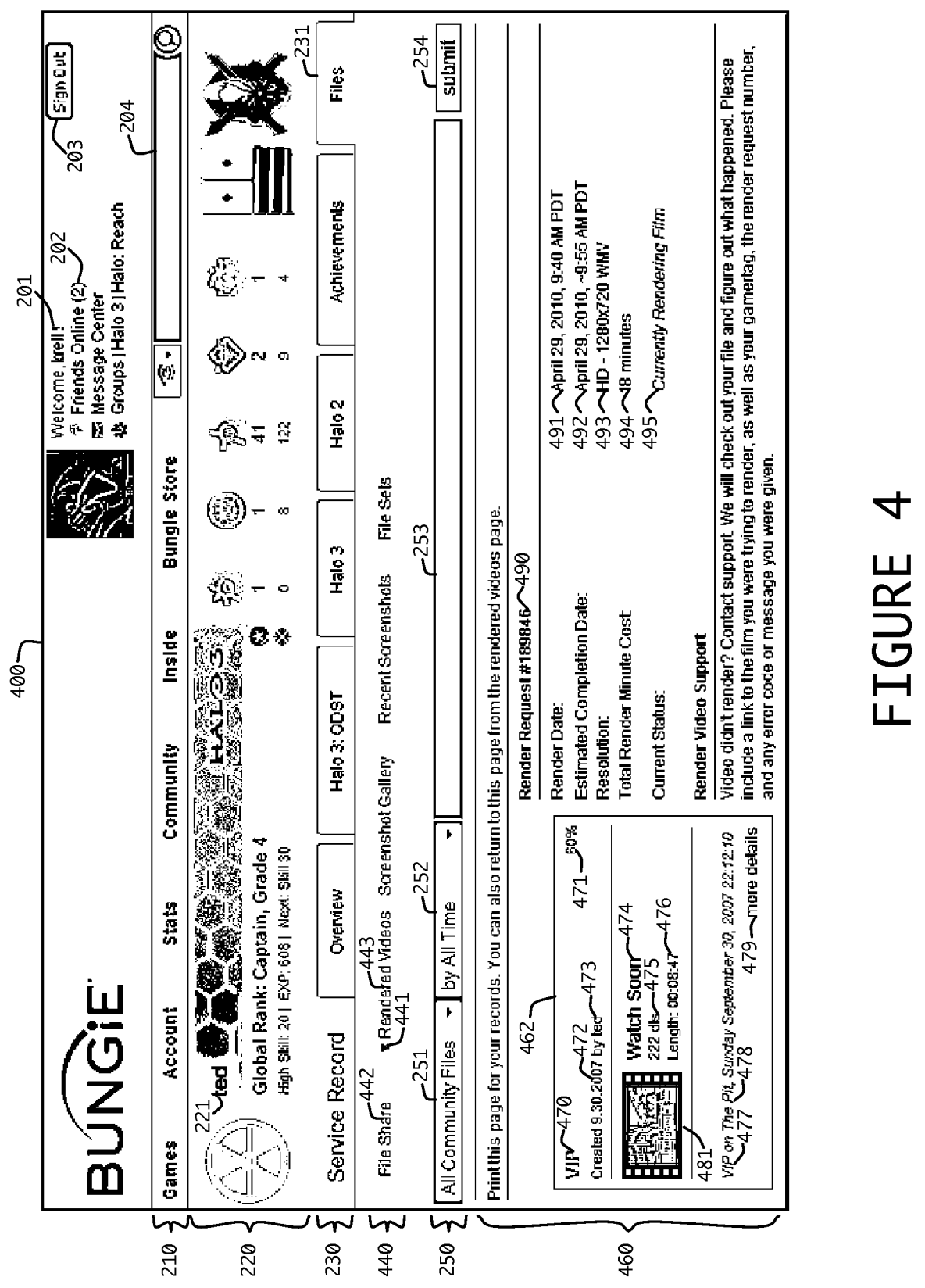

FIG. 4 is a receipt suitable for tracing the progress or results of the render request transaction; and, FIG. 5 is a flowchart for the game file rendering process of the present invention.

DETAILED DESCRIPTION OF THE INVENTION

Figure 1:
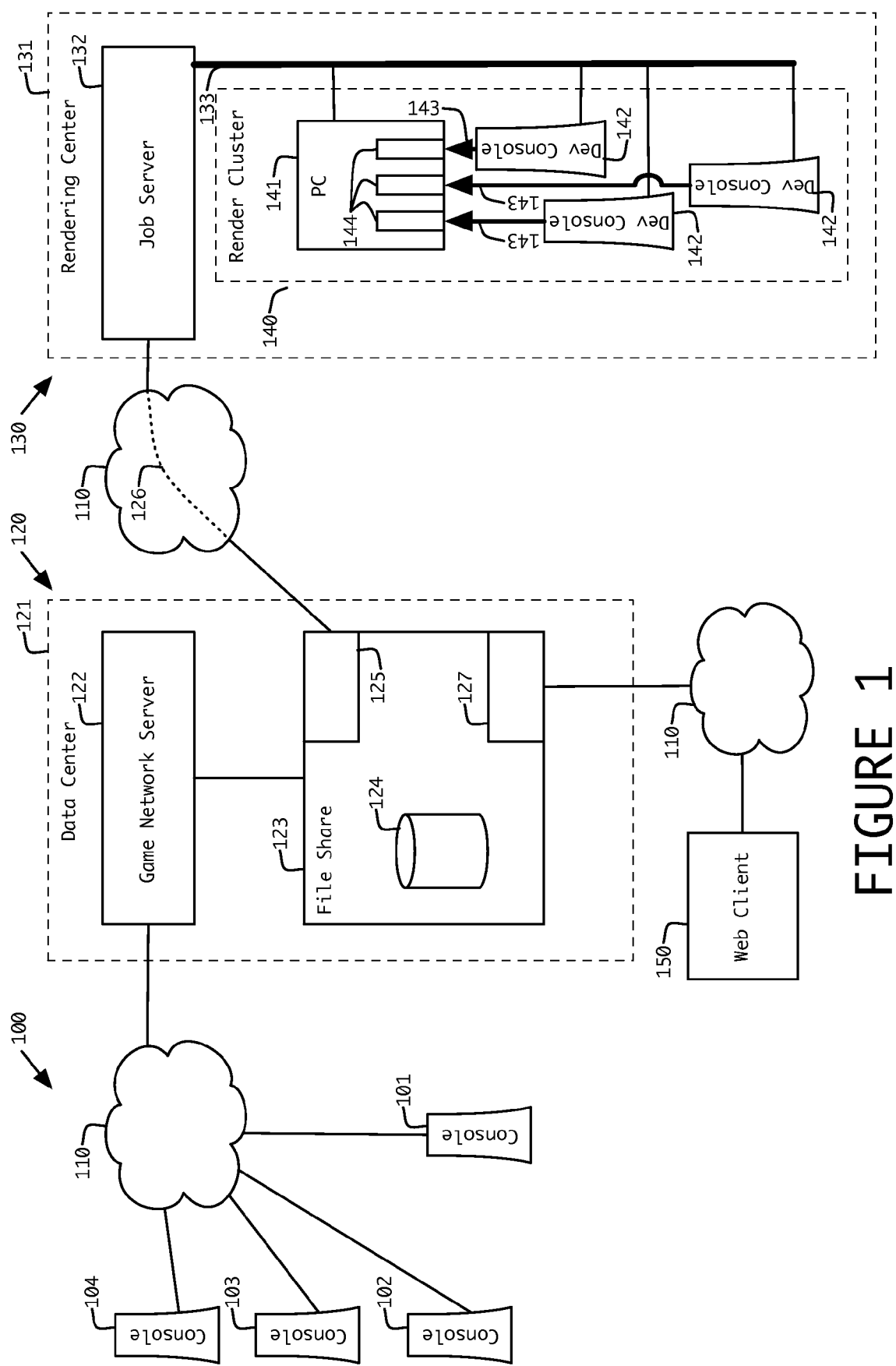
FIG. 1 is a block diagram of one embodiment of the present invention.

Referring to FIG. 1, game consoles 101-104 may play individually, or in a multi-node configuration 100 in which consoles 101-104 have communication with each other through a LAN (not shown) and/or Internet 110. A multi-player configuration may take place on a single console, or with different players playing among the consoles operating in a multi-node configuration, or both. In multi-node configuration 100, each of the participating consoles has a copy of the game program being played, whether from a local disc, cartridge, or file; or downloaded via the communication channel linking them.

Any of the consoles 101-104 may further communicate through Internet 110 with back end server system 120, generally maintained in a data center 121 for reliability and the capability for high bandwidth availability (though these features are not strictly required).

Back end server system 120 includes a game network server 122, which may provide, among other services, a game lobby, whereby a player at one console 101 prepared to play a particular game can discover other players similarly prepared on other consoles 102-104. Other services available through game network server 122 may include account maintenance, game history (e.g., a listing of in-game achievements), a leader board to identify high scoring players, game-related bulletins, and social networking features such as forums and instant messaging to other players.

In this embodiment, access to file share 123 is obtained through game network server 122, though other implementations are contemplated. File share 123 is a server dedicated to providing access to storage 124. When in communication with file share 123, a console 101 can upload or download or otherwise manage game files in storage 124, but only according to the policies and rules administered by file share 123. For example, it may be a policy that anyone may download a game file to their own console for viewing, but that only a player who uploads a game file is permitted to delete that game file, or upload edits of that game file, or cause that game file to be rendered. File share 123 would enforce such policies. File share 123 preferably offers a web server interface 127, which through Internet 110, can be accessed by a web client 150, for example running on a PC (though it could also be running on a game console similar to 101-104, but not shown). As will be seen from the discussions below, a game file may be rendered to an audio/video file, which also may be stored by file share 123 in storage 124. It may be a further policy maintained by file share 123 that such video files are available to a web client 150 through web server interface 127, but that game files are not.

File share 123 can communicate with a job server 132, which may be located other than in data center 121, here shown as render center 131, especially if high degrees of reliability and availability are not required and the physical resources used for rendering game files as video files may be otherwise tasked, as discussed below. This is because, unlike the services offered by game network server 122 and file share 123, if a rendering job fails in processing or transport, it can be retried with no permanent loss. Communication between file share 123 and job server 132 is through a dedicated interface 125 which may employ a secure communication channel or link 126 (e.g., a secure socket connection or a VPN connection) through Internet 110 to job server 132. The use of the secure link 126 minimizes the exposure of both file share 123 and job server 132 to disruption or unauthorized access.

After completing a game, for example involving a player at console 101, that player may use an in-game interface (not shown) to upload the game file to storage 124 by communication with file share 123, typically through game network server 122. The player at console 101 (or if policies allow, another user at a different console 102-104 or using web client 150) may request that the uploaded game file on storage 124 be rendered to an audio/video file (discussed in more detail below in conjunction with FIG. 2). In response to the request, file share 123 initiates a transaction for rendering, including collecting any details necessary to specify the rendering (discussed in more detail below in conjunction with FIG. 3). Descriptive text regarding the game file may be accepted from the requester, for example a title for the clip, or such information may be automatically generated based on attributes of the game file and its metadata (e.g., the name of the game, environment, players, requester, etc). The transaction may include a payment or other billing method in association with the requester's account. An electronic receipt is provided for the transaction and provides a current status of the rendering process, as shown in FIG. 4 and discussed in detail below.

Once the player or user has provided the appropriate details and committed to a transaction for rendering, file share 123 sends a render job comprising the game file (or a reference to it) and the rendering details to a rendering system 130 over secure link 126. In the implementation shown, rendering system 130 comprises job server 132 and one or more render clusters 140, each of which comprises a computer 141, typically a PC, which is commanded by job server 132 and in turn controls one or more consoles 142. Communication between job server 132 and all computers 141 (one shown) and between computers 141 and consoles 142 may be over separate networks, or as shown, over a single LAN 133 provided by one or more switches (shown implicitly as LAN 133). Generally, consoles 142 are substantially similar to consoles 101-104, but for most commercially available consoles today need to be the developer's version of the console. The reason for this is that consumer consoles 101-104 generally implement various security features or eliminate external management features to reduce the likelihood of unauthorized tampering. However, developers' consoles often offer remote management and control facilities not available in the consumer version. An example of two product having such a differentiation are the Xbox-360 by Microsoft Corporation, and the Xbox-360 Developers Console, by the same company wherein a telnet service allowing remote control of a console is provided by the Xbox-360 Developers Console, but not by the Xbox-360 console available to consumers. Note that for an implementation where consoles 101-104 are implemented as personal computers, then consoles 142 would similarly be implemented as personal computers.

When the job server 132 receives a render job, it dispatches the render job to a computer 141 in one render cluster 140. If all render clusters 140 are busy, job server 132 may queue the render job. Upon receiving the render job, computer 141 can command an available console 142 to load the game file corresponding to the render job, and when the load is complete, command the console 142 to replay the game file in accordance with the associate details, e.g., the requested resolution. As the console 142 complies, the audio and video output from console 142 is carried over output 143, for example an HDMI connection, to a corresponding capture card 144, also operated by and perhaps contained within computer 141. In the case of the Xbox-360 Developers Console, which does offer HDMI output, a capture card 144 suitable for this purpose is the Intensity Pro, manufactured by Blackmagic Design of Melbourne, Australia, the current drivers of which can support multiple capture cards in the same computer 141. Computer 141 configures corresponding capture card 144 to the appropriate resolution and file format (and other details as appropriate) and directs the audio/video captured from output 143 to a file. In executing the render job, computer 141 ensures that the corresponding capture card 144 is ready and capturing no later than the time that the output from corresponding console 142 reaches the in-point specified in the game file.

As console 142 reaches the out-point of the game file, computer 141 commands the capture card 144 to cease capturing and the resulting audio/video file is closed, but no sooner than the out-point of the game file. The resulting video file is returned to job server 132 and subsequently transmitted to file share 123 to reside on storage 124.

Throughout the rendering process, in some embodiments, job server 132 can track the status of the render job, either by polling computer 141 or from status change updates received from computer 141. Such updates may be relayed back to file share 123 to update the status as shown in the transaction receipt (discussed in conjunction with FIG. 4)

Either or both computers 141 and job server 132 may attempt to order and dispatch render jobs to optimize performance. For example, a certain amount of setup is required as a console 142 readies to replay a game file. In particular, the models of the environment and objects referred to by a game file must be loaded, if not already present. In the Halo 3 (™) product and others, the amalgamation of models, textures, environmental sounds, etc., comprising the environment and objects is referred to as a "map". Many different game files may refer to the same set of models (map). A computer 141 can optimize the utilization of a console 142 by providing a console 142 with consecutive game files all using the same environment and object models (i.e., the same map) thereby avoiding the need to always be loading the environment, etc. for each subsequent render. The job server 132 may participate in this optimization by preferring to send render jobs using a particular environment to particular render clusters 140.

It is worth noting that a hardware configuration of rendering system 130, in which job server 132 has communication directly or indirectly (e.g., though computer 141) with an array of developer consoles 142, is commonly seen in console game development for use as a quality assurance test bed. The usual operation of such an arrangement is to allow new builds of a game in development to be automatically subjected to a battery of standardized, automated tests (the mechanism for submitting such test runs is well known and not described in detail herein, and is thus not shown in the figures). Any failures of the new build are automatically detected by computer 141 or job server 132, and can be brought to a developer's attention so that the issue producing the failure can be analyzed and addressed.

Since the failure can be recreated by repeating the same test sequence, neither a game file nor video capture is required. Nonetheless, with the introduction of capture cards 144 to such a system, the test facility is transformed into a dual-purpose platform providing an implementation of render system 130. This transformation still leaves the system usable as a test center, thereby allowing a very efficient use of these resources. For instance, job server 132 may be directed to prioritize quality assurance jobs during a particularly heavy development period, which can result in longer waits for a render job to complete. At other times, for example during sponsored tournaments or marketing events, rendering jobs would receive the higher priority.

If different resolutions of video output can be specified in the render job, a number of options are available and may be manually or automatically selected according to policy. For example, if a render job specifies a high-definition output (e.g., where the output has 1080 lines of resolution), then lower resolution outputs (e.g., ones having 720 or 480 lines of output) may also be provided. Whether such lower resolutions must be explicitly requested and whether they are rendered as successive replays of the same game file, or whether the high-definition output file is reduced by a separate image scaling process performed by computer 141, or another device, is a matter of implementation and policy.

Regardless, all of the video files resulting, and the associated attributes (e.g., title, description, etc.), are placed in storage 124 and made available to web clients 150 and perhaps consoles 101-104 (if the audio/video files are suitable for playout on the consoles). Alternatively, or additionally, the resulting files may be automatically posted to user-generated media sharing services, for example those provided at YouTube.com, a website managed by YouTube, LLC of San Bruno, Calif. If, as is often the case, the external sharing services are limited to a particular, constrained resolution, then generally, the lowest resolution format provided by render center 131 should be provided to the external service.

Figure 2:
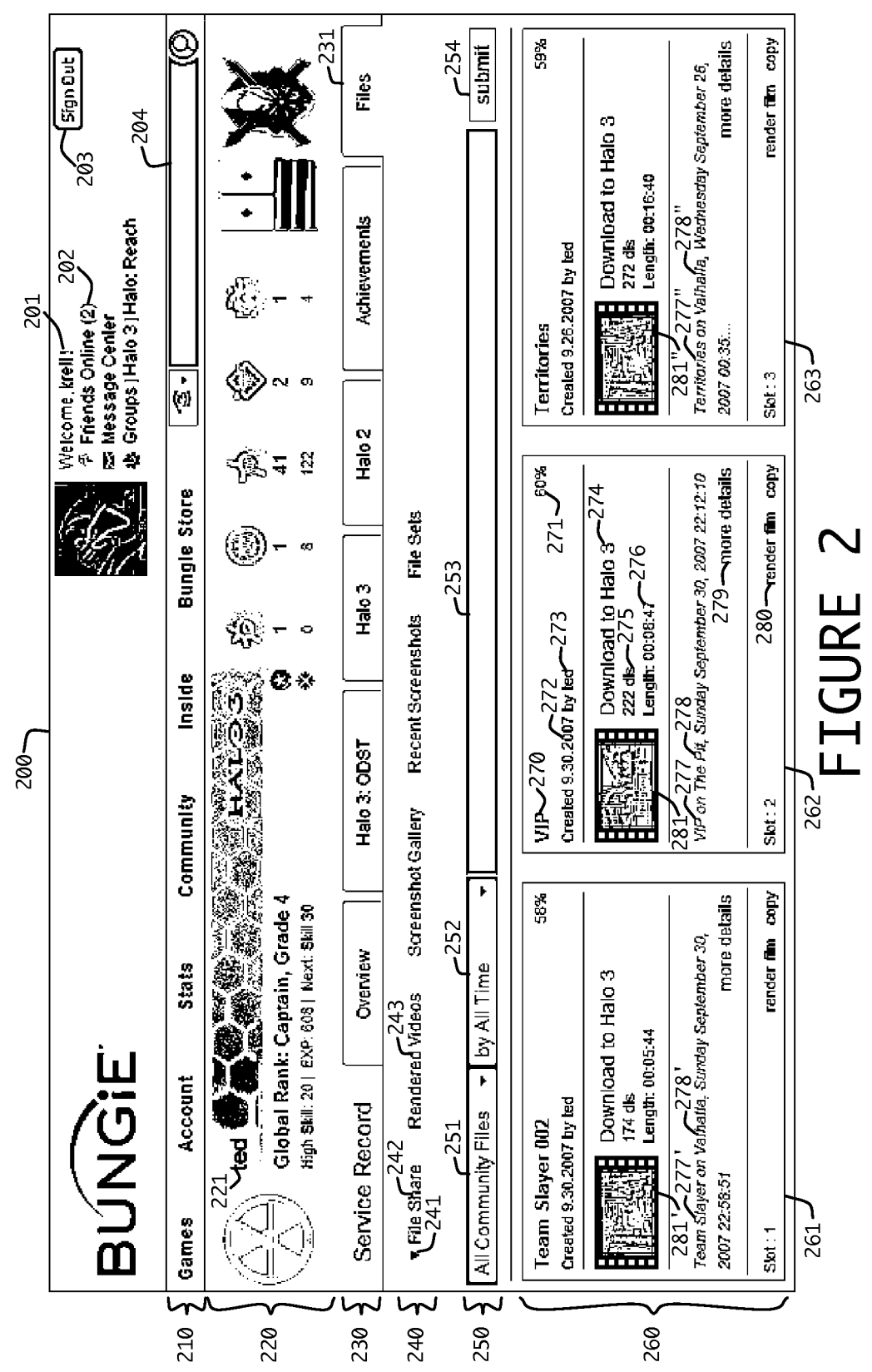

Turning now to FIG. 2, a user interface 200 is shown, as might be presented on consoles 101-104 or web client 150, for creating a transaction requesting that a game file be rendered to an audio/video file. Interface 200 may require that a user (i.e., player) is logged in, the successful completion of which is indicated by the username 201 being displayed. Social networking status and features can be listed, as exemplified by the "friends online" count 202. To keep a user's account secure, sign out button 203 may be provided. A high level menu 210 may be provided, for example to access different services available. An overview of a player's history 220 may be displayed, including screen name 221 and that player's scores and achievements. Further details relating to the player's history can be accessed through sub menu 230, which includes files tab 231. Files tab 231 provides access to and management of objects in storage 124 of file share 123. Uploading a game file to file share 123 would occur from within a game played, for example, on consoles 101-104 and as such is not represented in interface 200. However, file share menu 240 includes a menu item 242 for game files already uploaded (which in FIG. 2 is shown as being selected by current selection icon 241) and a menu item for videos rendered 243 (not shown as selected until FIG. 4).

With menu item 242 selected, information about uploaded game files are shown in game file list 260. The contents of game file list 260 may be filtered using the tools in filter bar 250, such as type selector 251, date selector 252, and/or keyword text entry box 253. The filter criteria selected with elements 251-253 can be imposed by submit button 254, which will narrow the results in game file list 260 to only those game files matching the filter criteria specified.

In this example, game file list is comprised of entries 261-263. If more entries are found than fit readably in the display area of game file list 260, then scroll bars or paging controls (neither shown) would be provided.

Each entry in game file list 260 may contain a title 270, a creation date 272, the author's screen name 273, rating 271, download count 275, duration 276, and game type 277, 277', and 277". The game file can be represented by an icon 281, but since the icon is needed before any rendering job has been issued, icon 281 is either generic for any game file (not shown), or may be generic for any game file using a particular environment, which for icon 281 is "The Pit" map as identified by map attribute 278. Thus, in this example where game file entries 261 and 263 have common map attributes 278' and 278" (both are "Valhalla"), their corresponding icons 281' and 281" are identical. However, since entry 262 has a different map attribute 278 ("The Pit"), its icon 281 is different. While not shown here, the icons 281, 281', 281" could be alternatively or further differentiated by the game type attributes 277, 277', 277".

Each entry in game file list 260 is also accompanied by controls, for instance download game file button 274 (to pull the associated game file into a console 101-104 for subsequent playback within the corresponding game listed in the button 274 ("Halo 3," in this instance). Note that creation date 272 is the date the original game file was recorded, i.e., it is the date when the game was originally played—not the date on which the file was edited (if it was edited) nor the date on which the file was uploaded. These other dates could be presented also, or made available for example through "more details" button 279. Finally, render file button 280 is provided to initiate a transaction to render the associated game file.

Figure 3:
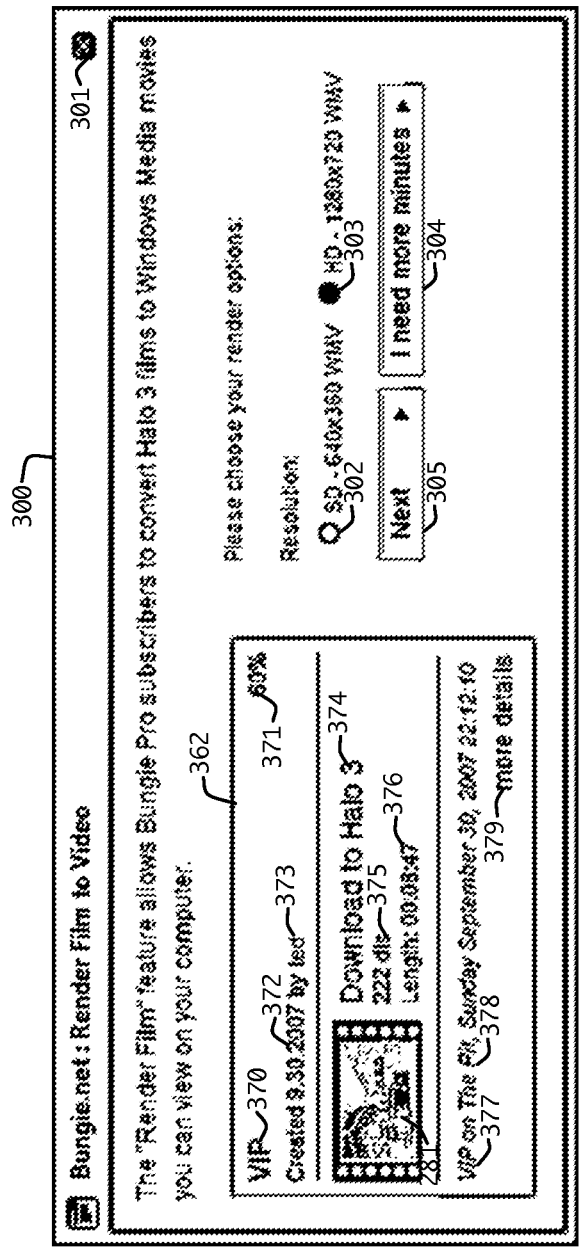
FIG. 3 is a dialog box for collecting details during a render request transaction.

When pressed, render file button 280 starts the transaction by asking for more details from the user with details dialog box 300, as show in FIG. 3. Within dialog box 300, the game file attributes display 362 is substantially similar to the corresponding entry 262 in interface 200 of FIG. 2. As such, there is a correspondence between titles 370 & 270, creation date 372 & 272, rating 371 & 271, author 373 & 273, download count 375 & 275, duration 376 & 276, game type 377 & 277, and map 378 & 278. For convenience, control buttons such as download button 374 for download (similar to button 274) and details button 379 (similar to button 279) for more details are also present. Newly presented are resolution selection buttons 302 and 303, in this example being for standard definition and high definition, respectively, both in Windows Media Video (WMV), a compressed video file format promoted by Microsoft Corporation. Other details could include a selection of alternative frame rates, or alternative file formats (e.g., MPEG4), etc. (none shown). Next button 305 confirms the transaction and submits a rendering job for the game file indentified by game attributes display 362 with the details selected, for example with buttons 302 and 303. If the requester wishes to cancel the transaction without rendering, a go-away box 301 can be clicked, and dialog box 300 will close.

If there is a payment to be billed or collected, it may be different for different selections offered in dialog box 300. If this is the case, and sufficient credit is available for one selection (e.g., the standard definition render selectable with button 302), but the requester does not have sufficient credit for other selections (e.g., the high definition render selectable with button 303), then a "I need more minutes" button 304 can initiate a process for increasing the available number of credits available. (Note that in the example of FIG. 3 and button 304, the term used for the notion of "credits" is "minutes").

Once the transaction is submitted with dialog box 300, the requester is presented with receipt interface 400, shown in FIG. 4. In receipt interface 400, the upper elements 201-204, 210, 220, 230, and 231 remain the same as in interface 200. However, in file share menu 440 (rather than 240), selected item icon 441 indicates the rendered videos menu item 443 to be active, not the file share menu item 442. Thus, instead of seeing game file list 260, rendered file list 460 is shown.

In rendered file list 460, each rendered file is represented by an entry such as entry 462 (only one entry shown in FIG. 4). Rendered file entry 462 includes many elements which remain consistent with corresponding ones of the game file entry 262, including title 470 and 270, creation dates 472 and 272, author's screen name 473 & 273, rating 471 and 271, download count 475 and 275, duration 476 & 276, game type 477 & 277, and map attribute 478 & 278. However, many details that appear when "more details" button 479 is pressed are specific to the rendered file (though some may correspond to the original game file, too). Many details will be specific to the rendered file: Render request 490 represents the transaction number corresponding to the request to produce a rendered audio/video file from game file entry 262. The date of the request 491, the completion date 492 (or estimated completion date, as shown in FIG. 4), the resolution 493 requested in the transaction detail dialog box 300, the charge 494 assessed against the account of the player indicated by the username 201 (noting again that in this example, the currency of billing is "minutes"), and the current status 495, "Currently Rendering Film," which is also expressed as disabled control 474 with the label "Watch Soon."

Note that in some contexts, the details of the render request can be displayed without pressing details button 479, for example immediately after having submitted a transaction from dialog box 300.

When the current status 495 reads "Rendering Complete" (not shown), then control button 474 would be enabled and would read "Watch Now" (not shown). Pressing control button 474 when it indicates "Watch Now" (not shown) would initiate download and playback of the rendered file, in the resolution selected.

In some cases, a render job may fail; in which case the current status 495 would be "Failed" and the user may be directed to contact support (as shown) or to resubmit the render request (not shown). Alternatively, if a render job does not reach a completed status within a predetermined amount of time, the render job might be retried automatically, or an operator notified.

In an alternative embodiment, statistics such as rating 471 and download count 475 may be tracked separately from rating 271 and download count 275 of the corresponding game file.

In an alternative embodiment of the present invention, differing from that shown in FIG. 1, individual console 101 or one of consoles 101-104 of multi-node configuration 100 may communicate directly with render system 130 through Internet 110 (this direct connection is not shown). In this embodiment, the functions of file share 123 and the functionality of user interfaces 200, 300, and 400 would be provided by the game running on the console (which might be a PC).

Figure 5:
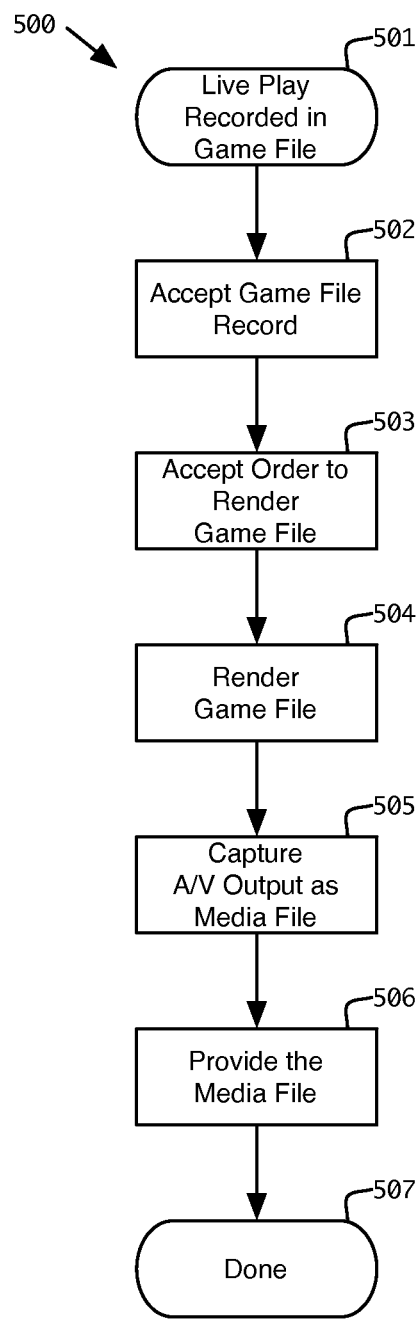

FIG. 5 is a flowchart for a rendering process 500 by an online rendering system, as is for example embodied in the render system 130. The initial condition for render process 500 is that a game file has been captured from live play, as shown at start 501. The game file is accepted by render system 130 through the Internet 110 at 502. In one embodiment, an order to render the game file is accepted at 503, with the order including such details as were discussed in conjunction with FIG. 3. However, in another embodiment, where such details are predetermined, the order to render may be implied, wherein accepting an order at 503 is not needed. In response to the game file accepted at 502 and the order accepted at 503 (if required), the rendering of the game file is undertaken by render system 130 at 504, and at 505 render system 130 captures the audio/video output of the rendering as a media file. The media file captured at 505 is then provided through the Internet 110 to the requester or others at 506. The rendering process 500 ends at 507.

As with all such systems, the particular features of the system, specifics of the user interfaces, and the performance of the processes, will depend on the architecture used to implement a system of the present invention, the operating system of the servers selected, the bandwidth and other properties of the network selected, and the software code written. It is not necessary to describe the details of such programming to permit a person of ordinary skill in the art to implement the processes described herein, and provide code and user interfaces suitable for executing the scope of the present invention. The details of the software design and programming necessary to implement the principles of the present invention are readily understood from the description herein. Various additional modifications of the described embodiments of the invention specifically illustrated and described herein will be apparent to those skilled in the art, particularly in light of the teachings of this invention. It is intended that the invention cover all modifications and embodiments, which fall within the spirit and scope of the invention. Thus, while preferred embodiments of the present invention have been disclosed, it will be appreciated that it is not limited thereto but may be otherwise embodied within the scope of the claims.

We claim:

1. A method for use with a plurality of game systems connected to the Internet, and one or more recipient computing devices connected to the Internet, the plurality of game systems being configured to play a plurality of games, the method comprising:
   a) automatically accepting, with a rendering system, game files from the plurality of game systems over the Internet, each of the game files having been recorded by an associated one of the plurality of games, and representing an interval of recorded live play of the associated game when the associated game was played on at least one of the plurality of game systems, the rendering system being different from each of the plurality of game systems;
   b) automatically rendering, with the rendering system, each of the game files as audio and video;
   c) automatically capturing, with the rendering system, the audio and video rendered for each of the game files as different audio/video file that corresponds to the game file thereby producing a plurality of audio/video files, each of the plurality of audio/video files being playable by other than the game associated with the game file corresponding to the audio/video file; and
   d) providing, with the rendering system, the plurality of audio/video files to the one or more recipient computing devices over the Internet.

2. The method of claim 1, further comprising:
   automatically accepting, with the rendering system, an order for each of the game file thereby accepting a plurality of orders, the order for each of the game files including details for the rendering of the game file, the automatic rendering of each of the game files being performed in response to and in accordance with the order for the game file, and the automatic capturing of the audio and video rendered for each of the game files being performed in accordance with the order for the came file.

3. The method of claim 2 wherein the details specify a resolution.

4. The method of claim 2 wherein the details specify an audio/video file format.

5. A system for use with a plurality of game systems connected to the Internet, and at least one recipient computing device connected to the Internet, the system comprising:
   at least one computer configured to accept game files over the Internet from the plurality of game systems, the at least one computer being different from the plurality of game systems, each of the game files having been recorded by a game, and representing an interval of recorded live play of the game when the game was played on at least one of the plurality of game systems;
   a game console connected to the at least one computer, the game console being configured to receive the game files from the at least one computer, and render each of the game files as audio and video,
   the at least one computer being further configured to captures the audio and video rendered by the game console for each of the game files as different audio/video file that corresponds to the game file thereby producing a plurality of audio/video files, and provide the plurality of audio/video files to the at least one recipient computing device via the Internet, each of the plurality of audio/video files being playable by other than the game.

6. The system of claim 5, wherein the at least one computer is configured to receive an order including details for the rendering of a particular one of the game files, and the audio/video file that corresponds to the particular game file is in conformance with the details.

7. The system of claim 6, wherein the details specify a resolution, the at least one computer is configured to provide the resolution to the game console, and the game console is configured to render the particular game file at the resolution in response to receiving the resolution from the at least one computer.

8. The system of claim 6, wherein the details specify an audio/video file format, and the audio/video file that corresponds to the particular game file is provided in the file format.

9. The method of claim 1, wherein at least one of the game files is an edited game file.

10. The method of claim 1, wherein at least one of the game files is a clipped game file.

11. The method of claim 2, further comprising:
    queuing at least a portion of the plurality of orders with the rendering system before rendering those of the game files for which the portion was accepted.

12. The system of claim 5, wherein at least one of the game files is an edited game file.

13. The system of claim 5, wherein at least one of the game files is a clipped game file.

14. The system of claim 6, wherein the order is held in a queue until the game console is available to receive and render the particular game file.

15. A rendering system for use with a plurality of game systems connected to the Internet, the system comprising:
    at least one storage device connected to the plurality of game systems by the Internet, the at least one storage device being configured to receive a plurality game files from the plurality of game systems over the Internet, the at least one storage device being separate and different from each of the plurality of game systems, each of the game files having been recorded by an associated one of a plurality of games, and representing an interval of recorded live play of the associated game when the associated game was played on at least one of the plurality of game systems;

a plurality of game consoles each separate and different from each of the plurality of game systems; and at least one computing device connected to the plurality of game consoles and the at least one storage device, the at least one computing device being configured to select one of the plurality of game consoles for each of the plurality game files, and instruct the selected game console to playback the game file, the selected game console sending audio and video information generated by the playback to the at least one computing device, the at least one computing device being further configured to capture the audio and video information generated by the playback as a media file, and store the media file on the at least one storage device, the media file being playable by other than the game associated with the game file corresponding to the audio/video file.

16. The system of claim 15, wherein the at least one computing device is further configured to post the media file to a user-generated media sharing service.

17. The system of claim 15, wherein a first one of the plurality game files is received by the at least one storage device from a first one of the plurality of game systems operated by a first user, and the media file captured from the playback of the first game file is downloadable by a different second user operating a different second one of the plurality of game systems.

18. The system of claim 15 for use with a client computing device, wherein a first one of the plurality game files is received by the at least one storage device from a first one of the plurality of game systems operated by a first user, and the media file captured from the playback of the first game file is downloadable by a different second user operating the client computing device.

\* \* \* \* \*